(12) United States Patent
Kim et al.

(10) Patent No.: US 12,553,641 B2
(45) Date of Patent: Feb. 17, 2026

(54) AIR CONDITIONER

(71) Applicant: SAMSUNG ELECTRONICS CO., LTD., Suwon-si (KR)

(72) Inventors: Donghyun Kim, Suwon-si (KR); Jinwoo Hong, Suwon-si (KR); Gahyun Kim, Suwon-si (KR); Sungwoo Kim, Suwon-si (KR); Joonho Yoon, Suwon-si (KR); Mingu Jeon, Suwon-si (KR); Mingi Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 525 days.

(21) Appl. No.: 18/083,880

(22) Filed: Dec. 19, 2022

(65) Prior Publication Data
US 2023/0204252 A1 Jun. 29, 2023

Related U.S. Application Data

(63) Continuation of application No. PCT/KR2022/020342, filed on Dec. 14, 2022.

(30) Foreign Application Priority Data

Dec. 23, 2021 (KR) .......................... 10-2021-0186003

(51) Int. Cl.
*F24F 13/15* (2006.01)
*F24F 1/0011* (2019.01)
(Continued)

(52) U.S. Cl.
CPC ............ *F24F 13/15* (2013.01); *F24F 1/0011* (2013.01); *F24F 1/0047* (2019.02);
(Continued)

(58) Field of Classification Search
CPC .............. F24F 13/15; F24F 2013/1433; F24F 2013/1453; F24F 2013/0616;
(Continued)

(56) References Cited

U.S. PATENT DOCUMENTS 11,067,298 B2 7/2021 Kim et al.
11,635,229 B2 4/2023 Ryu et al.
(Continued)

FOREIGN PATENT DOCUMENTS

CN 104266264 A 1/2015
CN 107940587 A 4/2018
(Continued)

OTHER PUBLICATIONS

Machine Translation of JP-2001201165 (Year: 2001).*
(Continued)

*Primary Examiner* — Allen R. B. Schult
*Assistant Examiner* — Amy E Carter
(74) *Attorney, Agent, or Firm* — STAAS & HALSEY LLP (57) ABSTRACT

An air conditioner including: a housing including a cylinder portion, an inlet, and an outlet formed in a lower portion of the cylinder portion and being in a shape of an arc; a heat exchanger positioned inside the cylinder portion and being in a shape of an arc; and a plurality of blades configured to selectively open or block the outlet, wherein the plurality of blades are arranged along a circumferential direction of the outlet and configured to move back and forth in a radial direction of the outlet to open or block the outlet, and each of the plurality of blades includes a plurality of holes configured to enable, upon blocking of the outlet by the blade, air entered the inlet to be discharged to outside of the housing through the blade.

15 Claims, 10 Drawing Sheets (51) Int. Cl.
*F24F 1/0047* (2019.01)
*F24F 13/08* (2006.01)
*F24F 13/12* (2006.01)
*F24F 13/14* (2006.01)

(52) U.S. Cl.
CPC ............ *F24F 13/082* (2013.01); *F24F 13/12* (2013.01); *F24F 2013/1433* (2013.01); *F24F 2013/1453* (2013.01)

(58) Field of Classification Search
CPC ........ F24F 1/0014; F24F 1/0047; F24F 13/12; F24F 1/0011; F24F 1/0067; F24F 13/082; F24F 13/20; F24F 2013/205; F24F 13/14; F24F 13/1426
USPC .......................................... 454/248, 237, 334
See application file for complete search history.

(56) References Cited

U.S. PATENT DOCUMENTS

| | | | | |
|---|---|---|---|---|
| 2017/0115027 | A1* | 4/2017 | Lee | F24F 1/0033 |
| 2018/0080665 | A1* | 3/2018 | Jung | F24F 1/0067 |
| 2018/0119984 | A1 | 5/2018 | Cho et al. | |
| 2019/0107298 | A1* | 4/2019 | Kim | F24F 13/10 |
| 2020/0263882 | A1 | 8/2020 | Kim et al. | |

FOREIGN PATENT DOCUMENTS

| | | | | |
|---|---|---|---|---|
| CN | 105864899 | B | | 4/2019 |
| CN | 108626791 | B | | 2/2020 |
| CN | 210179768 | U | | 3/2020 |
| CN | 210486007 | U | | 5/2020 |
| CN | 111288550 | B | | 5/2023 |
| EP | 3 534 077 | A1 | | 9/2019 |
| JP | 2000-310443 | A | | 11/2000 |
| JP | 2001201165 | A | * | 7/2001 |
| JP | 2004353910 | A | * | 12/2004 |
| JP | 2008-57948 | A | | 3/2008 |
| JP | 6283939 | | | 2/2018 |
| KR | 10-2007-0101678 | | | 10/2007 |
| KR | 20070101678 | A | * | 10/2007 |
| KR | 10-2019-0026325 | | | 3/2019 |
| KR | 10-2019-0061897 | | | 6/2019 |
| KR | 10-2021-0112121 | | | 9/2021 |
| KR | 10-2531649 | | | 5/2023 |

OTHER PUBLICATIONS

Machine Translation of JP-2004353910 (Year: 2004).*
Machine Translation of KR-20070101678 (Year: 2007).*
International Search Report dated Mar. 24, 2023 in International Patent Application No. PCT/KR2022/020342.
Extended European Search Report issued Oct. 15, 2024 for European Patent Application No. 22911761.9.

* cited by examiner

AIR CONDITIONER

CROSS-REFERENCE TO RELATED APPLICATION

This application is a continuation application, under 35 U.S.C. 111(a), of International Application No. PCT/KR2022/020342, filed on Dec. 14, 2022, which claims priority to Korean Patent Application No. 10-2021-0186003, filed on Dec. 23, 2021 in the Korean Intellectual Property Office, the disclosures of which are incorporated by reference herein in their entirety.

BACKGROUND

1. Field

The disclosure relates to an air conditioner, and more particularly, to an air conditioner having a circular outlet flow path.

2. Description of the Related Art

An air conditioner is an apparatus which includes a compressor, a condenser, an expansion valve, an evaporator, a blower fan, etc. to adjust indoor temperature, humidity, air flow, etc. by using a cooling cycle. Air conditioners are classified into a split type having an indoor unit placed indoor and an outdoor unit placed outdoor, and a window type in which both an indoor unit and an outdoor unit are installed in a housing.

The indoor unit of an existing air conditioner has been manufactured in a form capable of miniaturizing a heat exchanger and increasing a wind speed and an air volume by raising the revolutions per minute (RPM) of the blower fan. Accordingly, discharge temperature is lowered, and discharged air forms a narrow, long flow path and is discharged to an indoor space.

A user directly exposed to such discharged air may feel cold and displeasure, and a user not exposed to the discharged air may feel hot and displeasure.

Also, increasing the RPM of the blower fan to implement a high wind speed results in an increase of noise. A radiant air conditioner that conditions air without using any blower fan requires a large panel to implement the same performance as an air conditioner using a blower fan. Also, the radiant air conditioner has a very slow cooling speed and needs high cost.

SUMMARY

Therefore, it is an aspect of the disclosure to provide an air conditioner using various methods for discharging air.

It is another aspect of the disclosure to provide an air conditioner having a circular outlet from which air is discharged and configured to cool or heat an indoor space at a lowest wind speed at which a user feels pleasant.

Additional aspects of the disclosure will be set forth in part in the description which follows and, in part, will be obvious from the description, or may be learned by practice of the disclosure.

An air conditioner according to a concept of the disclosure includes: a housing including a cylinder portion, an inlet to allow air to be introduced into the housing, and an outlet formed at a portion of the cylinder portion and having an arc shape to allow the air to be discharged to an outside of the housing; a heat exchanger inside the cylinder portion and an arc shape; and a plurality of blades arranged along a circumferential direction of the outlet and configured to move back and forth along a radial direction of the outlet to selectively open or block the outlet, wherein each of the plurality of blades includes a plurality of holes to guide the air introduced through the inlet to be discharged to the outside of the housing while a blade among the plurality of blades blocks the outlet.

Also, each of the plurality of blades is positioned outside the outlet along an up-down direction upon opening of the outlet, and upon blocking of the outlet, the blade among the plurality of blades is positioned on the outlet along the up-down direction.

Also, the air conditioner may further include a cover member covering a lower circumferential end of the housing, wherein each of the plurality of blades may be positioned in an area on the cover member along the up-down direction upon opening of the outlet.

Also, the housing may further include a lower housing below the cylinder portion and in which the inlet is formed, and each of the plurality of blades is in an inside area of the lower housing along the up-down direction upon opening of the outlet.

Also, each of the plurality of blades may further include a blade body in which the plurality of holes are formed, and the blade body of each of the plurality of blades is provided to close the outlet while the blade body of each of the plurality of blades is disposed on the outlet so that the air entered through the inlet is discharged to the outside of the housing through the plurality of holes of the blade.

Also, the air conditioner may further include a driver to operate the plurality of blades so that each of the plurality of blades moves back and forth along the radial direction of the outlet.

Also, the driver may include a first driver configured to operate the plurality of blades so that the plurality of blades move along the radial direction of the outlet, and a second driver configured to operate the plurality of blades so that the plurality of blades move along an opposite direction of the radial direction of the outlet.

Also, the first driver may include a first wire connected with the plurality of blades and a first driving motor connected with the first wire and configured to rotate and wind the first wire, and each of the plurality of blades may move along the radial direction of the outlet by interworking with the first wire, upon winding of the first wire by the first driving motor.

Also, the second driver may include a second wire connected with the plurality of blades and a second driving motor connected with the second wire and configured to rotate and wind the second wire, and each of the plurality of blades may move along the opposite direction of the radial direction of the outlet by interworking with the second wire, upon winding of the second wire by the second driving motor.

Also, each of the plurality of blades may further include a blade body in which the plurality of holes are formed, and the first wire may be connected at an outer edge of the blade body of each of the plurality of blades. Also, the blade body may include an outer circumferential portion positioned adjacent to an outer circumferential end of the outlet upon closing of the outlet by the blade, and a connecting portion positioned at a center of the outer circumferential portion along the circumferential direction of the outlet and connected with the first wire.

Also, the first wire may be a single piece, and the first wire may be connected with all connecting portions of the plurality of blades.

Also, each of the plurality of blades may further include a blade body in which the plurality of holes are formed, and the second wire may be connected with adjacent to an inner edge along the radial direction of the outlet of the blade body of each of the plurality of blades.

Also, the blade body may include an inner circumferential portion positioned adjacent to an inner circumferential end of the outlet upon closing of the outlet by the blade, and a penetrating portion through which the second wire penetrates the inner circumferential portion along the circumferential direction of the outlet.

Also, the second wire may be a single piece, and the second wire may penetrate all penetrating portions of the plurality of blades.

An air conditioner according to a concept of the disclosure includes: a housing including a cylinder portion, an inlet, and an outlet formed in a lower portion of the cylinder portion and being in a shape of an arc; a heat exchanger positioned inside the cylinder portion and being in a shape of an arc; a plurality of blades configured to selectively open or close the outlet, wherein each of the plurality of blades includes a plurality of holes through which air entered the inlet is discharged upon closing of the outlet; and a driver configured to operate the plurality of blades such that the plurality of blades move to open or close the outlet, wherein the driver is configured to move the plurality of blades to be positioned outside the outlet in an up-down direction upon opening of the outlet by the plurality of blades and move, upon closing of the outlet by the plurality of blades, the plurality of blades to be positioned on the outlet in the up-down direction.

Also, the plurality of blades may be arranged along a circumferential direction of the outlet and move back and forth in a radial direction of the outlet.

Also, the driver may include a first driver configured to operate the plurality of blades to move the plurality of blades in the radial direction of the outlet, the first driver may include a first wire connected with the plurality of blades and a first driving motor connected with the first wire and configured to rotate to wind the first wire, and each of the plurality of blades may move in the radial direction of the outlet by interworking with the first wire, upon winding of the first wire by the first driving motor.

Also, the driver may include a second driver configured to operate the plurality of blades to move the plurality of blades in an opposite direction of the radial direction of the outlet, the second driver may include a second wire connected with the plurality of blades and a second driving motor connected with the second wire and configured to rotate to wind the second wire, and each of the plurality of blades may move in the opposite direction of the radial direction of the outlet by interworking with the second wire, upon winding of the second wire by the second driving motor.

An air conditioner according to a concept of the disclosure includes: a housing including a cylinder portion, an inlet, and an outlet formed in a lower portion of the cylinder portion and being in a shape of an arc; a cover member covering a lower circumferential end of the housing; a heat exchanger positioned inside the cylinder portion and being in a shape of an arc; and a plurality of blades configured to selectively open or block the outlet, wherein each of the plurality of blades includes a plurality of holes configured to enable, upon closing of the outlet, air entered the inlet to be discharged to outside of the housing through the blade, wherein the plurality of blades are arranged along a circumferential direction of the outlet and configured to move back and forth in a radial direction of the outlet to open or block the outlet, the plurality of blades move in the radial direction of the outlet to be positioned in an area on the cover member in an up-down direction upon opening of the outlet, and upon blocking of the outlet, the plurality of blades move in the opposite direction of the radial direction of the outlet to be positioned on the outlet in the up-down direction.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Configurations illustrated in the embodiments and the drawings described in the present specification are only the preferred embodiments of the disclosure, and thus it is to be understood that various modified examples, which may replace the embodiments and the drawings described in the present specification, are possible when filing the present application.

Also, like reference numerals or symbols denoted in the drawings of the present specification represent members or components that perform the substantially same functions.

The terms used in the present specification are merely used to describe embodiments, and are not intended to limit the disclosure. An expression used in the singular encompasses the expression of the plural, unless it has a clearly different meaning in the context. In the present specification, it is to be understood that the terms such as "comprising", "including" or "having", etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various components, these components should not be limited by these terms. The above terms are used only to distinguish one component from another. For example, a first component discussed below could be termed a second component, and similarly, a second component may be termed a first component without departing from the teachings of this disclosure. As used herein, the term "and/or" includes any and all combinations of one or more of associated listed items.

In the following description, the terms "front end", "rear end", "upper portion", "lower portion", "upper end", and "lower end" are defined based on the drawings, and the shapes and positions of the corresponding components are not limited by the terms.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings.

Figure 1:
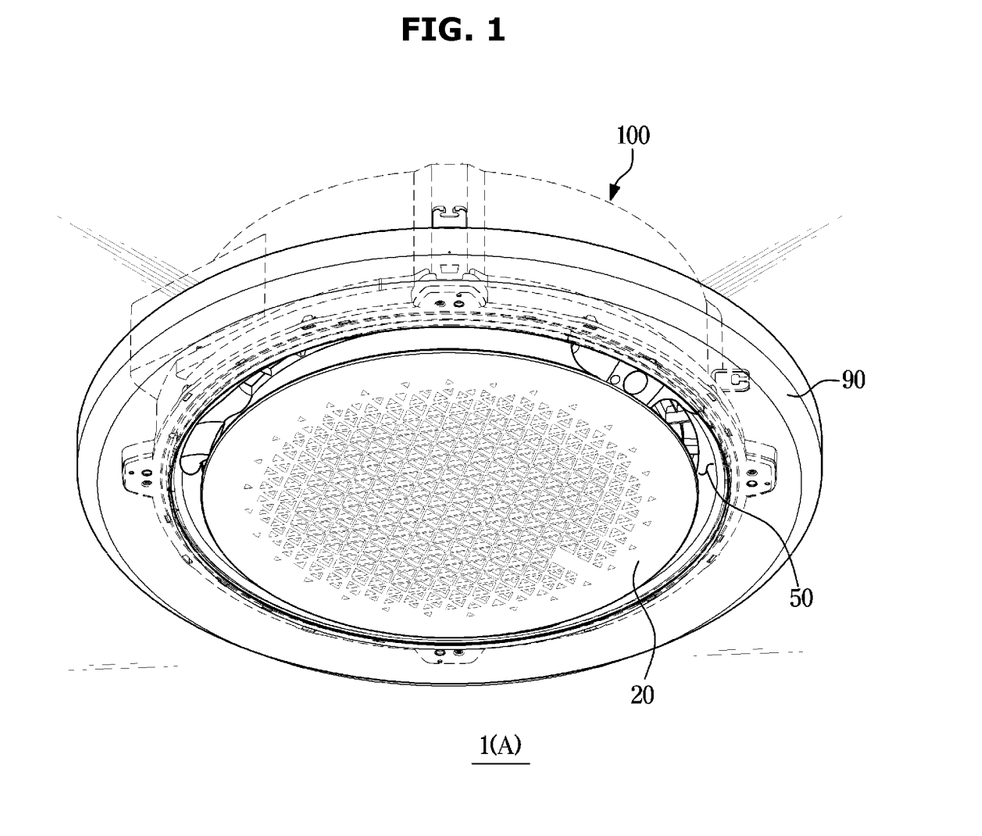
FIG. 1 is a perspective view of an air conditioner according to an embodiment of the disclosure, which operates in a first mode.
Figure 2:
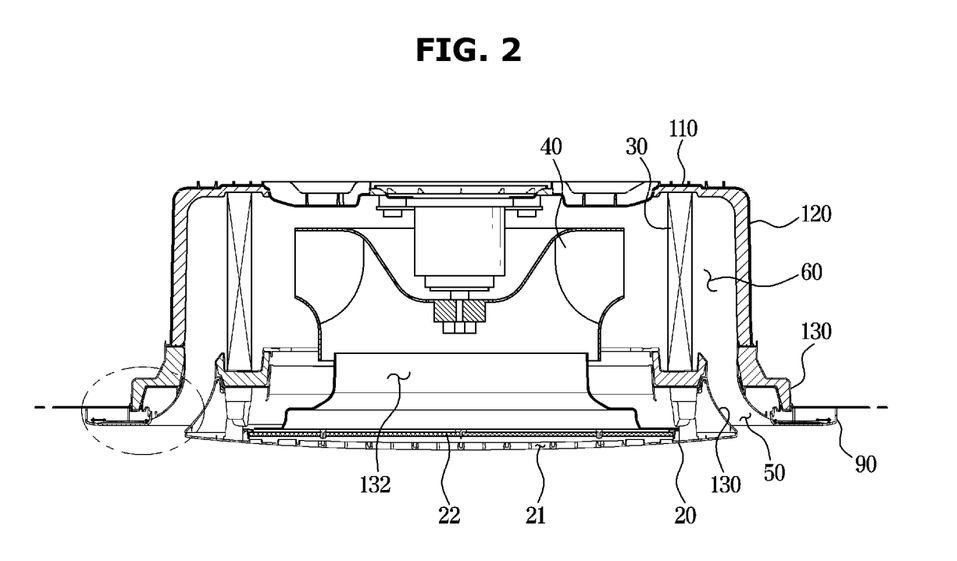
FIG. 2 is a side cross sectional view of the air conditioner shown in FIG. 1.
Figure 3:
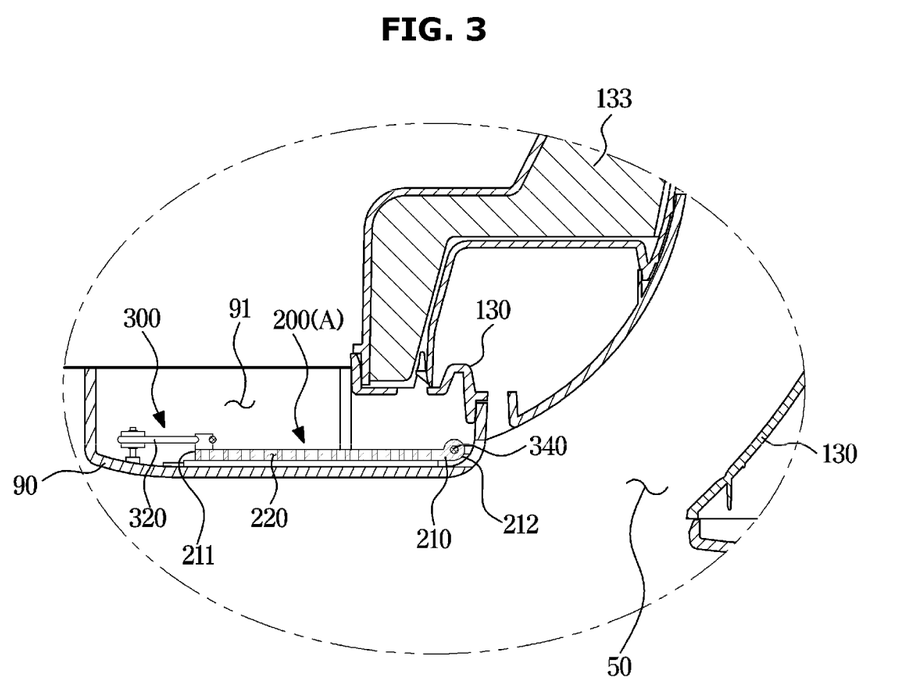
FIG. 3 is an enlarged view of an area denoted in FIG. 2.
Figure 4:
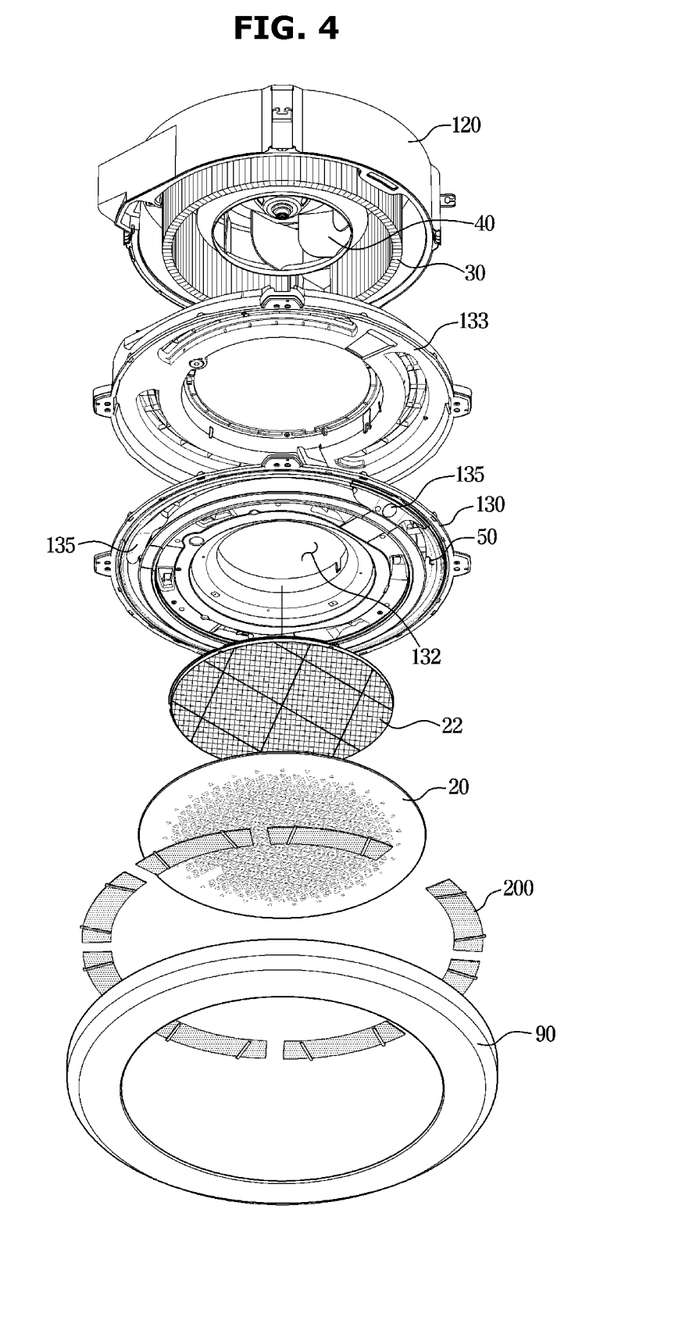
FIG. 4 is an exploded perspective view of an air conditioner according to an embodiment of the disclosure.

FIG. 1 is a perspective view of an air conditioner according to an embodiment of the disclosure, which operates in a first mode, FIG. 2 is a side cross sectional view of the air conditioner shown in FIG. 1, FIG. 3 is an enlarged view of an area denoted in FIG. 2, and FIG. 4 is an exploded perspective view of an air conditioner according to an embodiment of the disclosure.

As shown in FIGS. 1 to 3, an air conditioner 1 may be installed on a ceiling. At least one portion of the air conditioner 1 may be embedded into the ceiling.

The air conditioner 1 may include a housing 100 being substantially in a shape of a cylinder, a heat exchanger 30 installed inside the housing 100, and a blower fan 40 for causing air to flow.

The housing 100 may include an upper housing 110, and a lower housing 130 positioned below the upper housing 110. The upper housing 110 may include a cylinder portion 120 having a cylinder shape that extends in an up-down direction. The cylinder portion 120 is not limited to a cylinder shape of which a section is a circle, and the cylinder portion 120 may be in a shape of an elliptical cylinder or a polyprism.

The heat exchanger 30 and the blower fan 40 may be installed inside the upper housing 110.

The heat exchanger 30 may be in a shape of an arc. The heat exchanger 30 may be in a shape of a ring of which at least one portion is cut out. The heat exchanger 30 may be installed inside an inner circumferential surface 121 of the cylinder portion 120 in a radial direction of the cylinder portion 120.

The blower fan 40 may be installed inside the heat exchanger 30 in the radial direction of the cylinder portion 120 such that air entered inside of the housing 100 by the blower fan 40 is heat-exchanged in the heat exchanger 30.

The housing 100 may include an inlet panel 20 forming an inlet 21 through which air enters the inside of the housing 100 by the blower fan 40. The inlet panel 20 may be detachably coupled with the lower housing 130. The inlet panel 20 may be coupled with or separated from the lower housing 130 by rotating in a circumferential direction of the cylinder portion 120 with respect to the lower housing 130.

The inlet panel 20 may be positioned in a center portion of the lower housing 130. Through the inlet 21 formed in the inlet panel 20, air may enter the inside of the housing 100 through a lower center of the housing 100.

On an upper surface of the inlet panel 20, a filter 22 for removing foreign materials in air entered the housing 100 may be provided. Air passed through the filter 22 may enter the inside of the housing 100 through the lower housing 130.

The housing 100 may include an outlet 50 formed in a lower end of the lower housing 130 and having an arc shape. The outlet 50 may be formed at an outer location than an outer circumferential end 31 of the heat exchanger 30 in the radial direction of the cylinder portion 120 on the lower end of the lower housing 130.

The outlet 50 may be provided in a shape of a ring of which a portion is cut out. An inner circumferential end 51 and an outer circumferential end 52 of the outlet 50 may be formed by the lower housing 130, although not limited thereto. However, the outer circumferential end 52 of the outlet 50 may be formed by the upper housing 110.

The air conditioner 1 may include an outlet flow path 60 formed between the outer circumferential end 31 of the heat exchanger 30 and an inner circumferential surface 121 of the cylinder portion 120 such that air entered the inside of the housing 100 by the blower fan 40 is heat-exchanged in the heat exchanger 30 and then discharged to the outlet 50.

The outlet flow path 60 may be a space formed between the outer circumferential end 31 of the heat exchanger 30 and the inner circumferential surface 121 of the cylinder portion 120, and a lower end of the outlet flow path 60 may form the outlet 50.

The lower housing 130 may have a curved portion 131 for guiding air that is discharged through the outlet flow path 60. The curved portion 131 may guide an air flow discharged through the outlet flow path 60 toward the outlet 50.

The lower housing 130 may include an inlet flow path 132 for guiding air entered through the inlet 21. The inlet flow path 132 may be positioned at an inner location than the outlet flow path 60 in the radial direction of the cylinder portion 120.

The inlet flow path 132 may be formed in the center portion of the lower housing 130. The curved portion 131 may be formed at an outer location than the inlet flow path 132 in the radial direction of the cylinder portion 120. The curved portion 131 may guide air moving through the outlet flow path 60 to flow in close contact with the curved portion 131.

Air entered the inside of the housing 100 through the inlet 21 may be heat-exchanged in the heat exchanger 30 through the inlet flow path 132, then guided by the curved portion 131 along the outlet flow path 60, and discharged to the outlet 50.

The lower housing 130 may include a drain tray 133 for collecting condensed water generated in the heat exchanger 30. The drain tray 133 may be positioned as an independent component above the lower housing 130, or the drain tray 133 may be integrated into the lower housing 130. That is, the lower housing 130 forming a portion of the housing 100 may collect condensed water.

According to an embodiment of the disclosure, the lower housing 130 may be positioned below the upper housing 110, wherein at least one portion of the lower housing 130 extends to outside of the upper housing 110 from below the upper housing 110 in the radial direction of the cylinder portion 120, although not limited thereto. However, the lower housing 130 may be positioned at an inner location than the cylinder portion 120 in the radial direction of the cylinder portion 120.

The air conditioner 1 may include a cover member 90 covering a lower circumferential end of the lower housing 130. The cover member 90 may be in a shape of a ring, although not limited thereto. However, the cover member 90 may be provided in a shape of a polygon having a cavity through which a lower portion of the air conditioner 1 passes.

The cover member 90 may be formed as a separate component from the lower housing 130, although not limited thereto. However, the cover member 90 may be integrated into the lower housing 130 in such a way as to be separable from the lower housing 130 as a component of the lower housing 130.

The cover member 90 may be coupled with the lower housing 130 in such a way as to rotate in the circumferential direction of the cylinder portion 120 to be separated from the lower housing 130. The cover member 90 may form an outer appearance of the air conditioner 1, although not limited thereto. However, the cover member 90 may be detachably coupled with the upper housing 110, although not limited thereto. Also, the cover member 90 may be detachably coupled with the drain tray 133 of the lower housing.

The cover member 90 may include a cover area 91 formed in an upper surface of the cover member 90 in the up-down direction. The cover area 91 may be an area not exposed to outside due to the cover member 90, as seen from below. In the cover area 91, at least one component of a driver 300 which will be described below may be positioned, and in a first mode 1A of the air conditioner 1, a plurality of blades 200 may be positioned in the cover area 91.

A mode in which air is discharged from the outlet 50 of the air conditioner 1 is referred to as the first mode 1A. As the air conditioner 1 discharges air through the outlet 50 being in a shape of a ring, air may be discharged in all directions in an indoor space. The first mode 1A of the air conditioner 1 may be an operation state in which the air conditioner 1 discharges air through the outlet 50.

However, as the outlet 50 is in a shape of a ring, it may be difficult to control a discharge air flow through existing rectangular blades. Accordingly, the air conditioner 1 may include an air flow controller (not shown) for controlling a discharge air flow discharged from the outlet 50, although not shown in the drawings. For example, the air flow controller (not shown) may include an auxiliary fan (not shown) to suck a part of air discharged from the outlet 50 and control a direction of a discharge air flow, although not limited thereto. As another example, the air flow controller (not shown) may include a blade protruding in the up-down direction to control a direction of an air flow discharged from the outlet 50.

The housing 100 may include a blocking portion 150 extending by a preset length in a circumferential direction of the outlet 50 on the outlet flow path 60 or the outlet 50. A plurality of blocking portions 150 may be spaced a predetermined distance from each other along the circumferential direction. A single or plurality of blocking portions 150 may be provided.

The outlet 50 may be provided in a shape of a circular closed loop in correspondence to the outlet flow path 60 to discharge air in all directions. In this case, relatively high pressure may be formed around the outlet 50, and relatively low pressure may be formed around the inlet 21. Also, because air is discharged in all directions of the outlet 50 to form an air curtain, air that needs to be sucked through the inlet 21 may be not supplied toward the inlet 21. In this state, air discharged from the outlet 50 may be again sucked through the inlet 21, and the air may cause dew formation inside the housing 100, resulting in loss of air that is discharged and deterioration of sensory performance.

Accordingly, the blocking portion 150 according to an embodiment of the disclosure may cross the outlet 50 being in a shape of a ring in the radial direction of the cylinder portion 120 to block at least one portion of the outlet 50 such that the outlet 50 is formed in a shape of a ring of which a portion is cut out. The blocking portion 150 is also referred to as a bridge.

That is, the blocking portion 150 may partition a complete ring shape of the outlet 50 by a preset length such that the outlet 50 is formed in a shape of a partially blocked annular shape.

The blocking portion 150 may be positioned in the lower housing 130. More specifically, the blocking portion 150 may limit discharging of at least one part of air moving around the outlet 50 and the outlet flow path 60.

Because an area in which no air is discharged is formed by the blocking portion 150, a pressure difference between low pressure around the inlet 21 and high temperature around the outlet 50 may be reduced. Due to the blocking portion 150, air discharged from the outlet 50 may be dispersively discharged toward the indoor space without being again sucked into the inlet 21, as described above.

Various electronic components for operating the air conditioner 1 may be positioned in the up-down direction on the area in which the blocking portion 150 is positioned. A display 151 for displaying a state of the air conditioner 1 may be positioned on the area in which the blocking portion 150 is positioned, although not limited thereto. However, other electronic components may be positioned, and some components of the driver 300 which will be described below may be positioned on the blocking portion 150.

Hereinafter, the air conditioner 1 operating in a second mode 1B which is a low-speed discharge mode of implementing a lower wind speed of a discharge air flow than in a case of discharging air through the outlet 50 will be described in detail.

Figure 5:
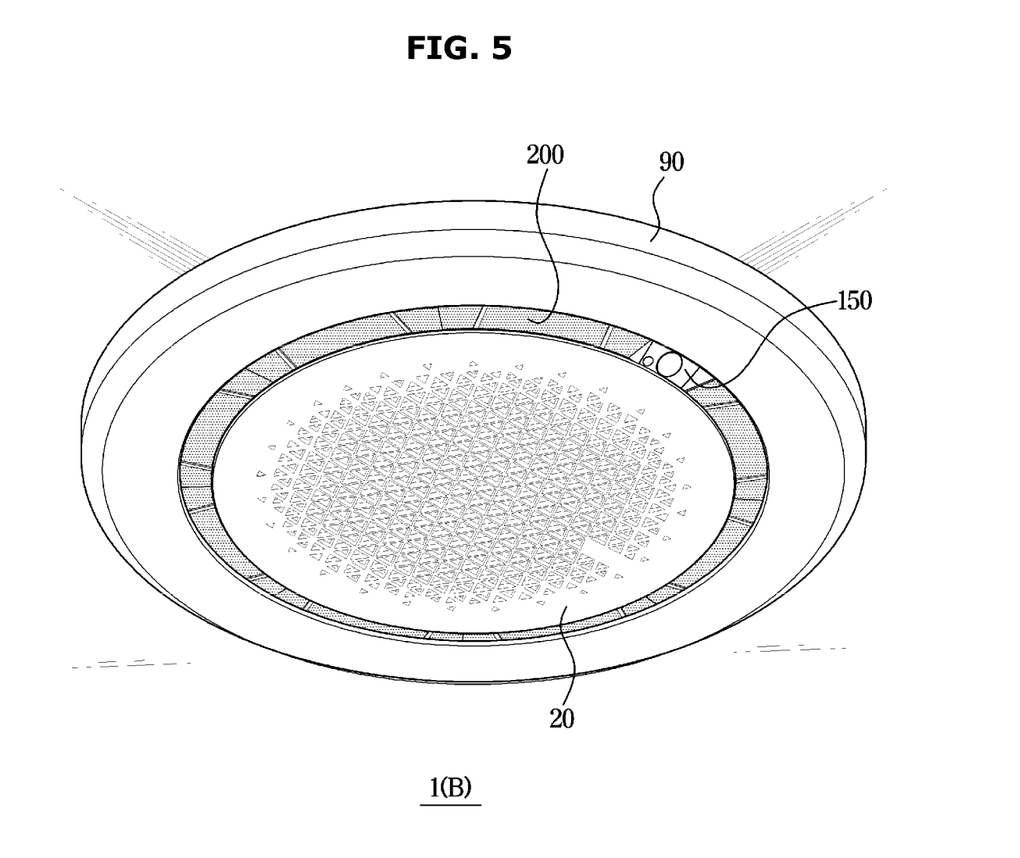
FIG. 5 is a perspective view of an air conditioner according to an embodiment of the disclosure, which operates in a second mode.
Figure 6:
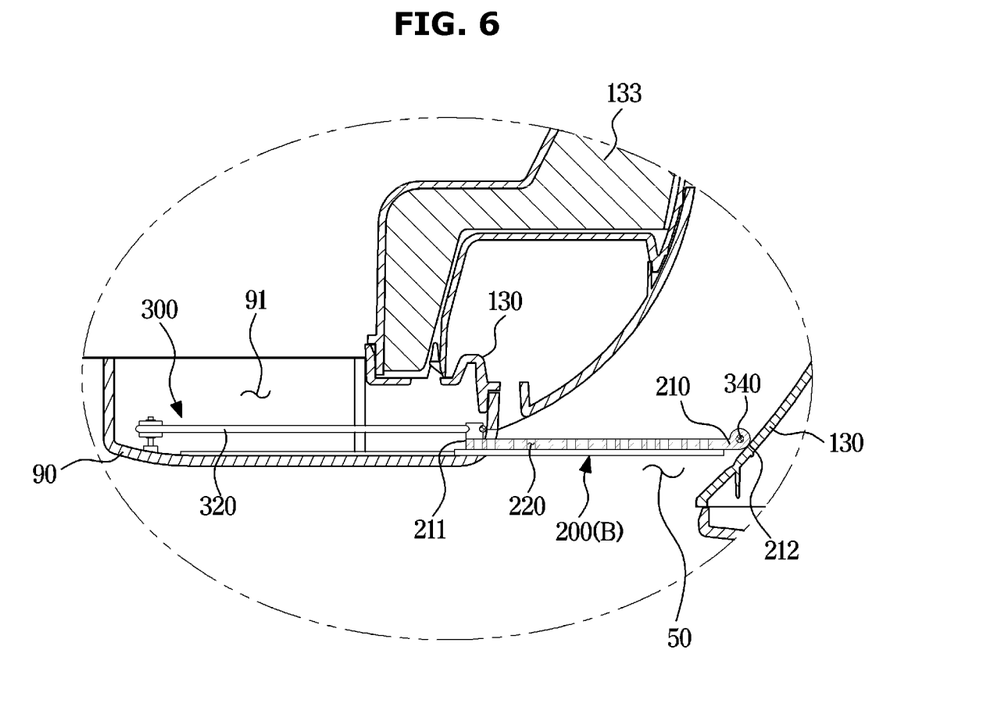
FIG. 6 is an enlarged view showing a portion of a cross section of the air conditioner shown in FIG. 5.

FIG. 5 is a perspective view of an air conditioner according to an embodiment of the disclosure, which operates in a second mode, and FIG. 6 is an enlarged view showing a portion of a cross section of the air conditioner shown in FIG. 5.

A user directly exposed to discharged air may feel cold and displeasure, and a user not exposed to discharged air may feel hot and displeasure. Accordingly, an air conditioner may discharge air at a lowest wind speed at which a user feels pleasant. In this case, a control operation of simply reducing RPM of a fan may deteriorate indoor cooling efficiency. Accordingly, the air conditioner may discharge air through an outlet plate in which a plurality of holes are arranged on an outlet, to discharge air at a low wind speed while maintaining indoor cooling efficiency.

However, because the air conditioner 1 according to an embodiment of the disclosure is a ceiling-mounted type configured to quickly cool an indoor space by discharging air at a high wind speed, the air conditioner 1 may need to discharge air selectively at a low wind speed as necessary.

Accordingly, the air conditioner 1 according to an embodiment of the disclosure may operate in the first mode 1A, as a normal mode, of discharging air at a high wind speed by discharging air through the outlet 50, and the second mode 1B of discharging air at a low wind speed through the plurality of blades 200.

However, because the outlet 50 of the air conditioner 1 according to an embodiment of the disclosure is in a shape of a ring, there may be difficulties in switching between the first mode 1A and the second mode 1B.

To resolve this, the air conditioner 1 according to an embodiment of the disclosure may include the plurality of blades 200 and the driver 300 to enable easy switching between the first mode 1A and the second mode 1B.

FIGS. 5 and 6 show the air conditioner 1 which operates in the second mode 1B. As shown in the drawings, the air conditioner 1 may include a plurality of blades 200 positioned on the outlet 50 in the second mode 1B.

The plurality of blades 200 may move back and forth in the radial direction of the outlet 50 to open or block the outlet 50.

The plurality of blades 200 may include a plurality of holes 220, which enable, upon blocking of the outlet 50 by the plurality of blades 200, air entered the inside of the housing 100 through the inlet 21 to be discharged to the outside of the housing 100 through the plurality of blades 200.

Upon opening of the outlet 50 by the plurality of blades 200, the plurality of blades 200 may be positioned outside the outlet 50 in the up-down direction, and, upon blocking of the outlet 50 by the plurality of blades 200, the plurality of blades 200 may be positioned on the outlet 50 in the up-down direction.

More specifically, in the first mode 1A, the plurality of blades 200 may be positioned in the cover area 91 of the cover member 90 formed outside the outlet 50 in the radial direction of the outlet 50 (see FIG. 3).

In the second mode 1B, the plurality of blades 200 may be positioned on the outlet 50 by moving in an opposite direction of the radial direction of the outlet 50 from the cover area 91. Accordingly, air moved to the outlet 50 may be discharged to the outside of the housing 100 through the plurality of holes 220 formed in the plurality of blades 200, without being discharged through the outlet 50 due to the plurality of blades 200.

Because the plurality of blades 200 discharge air through the plurality of holes 220, instead of the outlet 50, the plurality of blades 200 may cause air to be uniformly discharged at a lower speed through an area where the plurality of holes 220 are arranged, than in the case of discharging air through the outlet 50.

Each of the plurality of blades 200 may include a blade body 210, and the plurality of holes 220 may be uniformly arranged in the substantially entire area of the blade body 210.

The blade body 210 may include an inner circumferential portion 212 corresponding to the inner circumferential end 51 of the outlet 50 in the up-down direction upon blocking of the outlet 50, and an outer circumferential portion 211 corresponding to the outer circumferential end 52 of the outlet 50 in the up-down direction upon blocking of the outlet 50.

Upon positioning of the plurality of blades 200 on the outlet 50, the outer circumferential portion 211 and the inner circumferential portion 212 may respectively overlap with the outer circumferential end 52 and the inner circumferential end 51 of the outlet 50 in the up-down direction to block a flow of air moving along the outer circumferential end 52 and the inner circumferential end 51 and cause air to be discharged through the plurality of holes 220.

The plurality of blades 200 may move back and forth between a first location A at which the plurality of blades 200 open the outlet 50 and are positioned outside the outlet 50 in the radial direction of the outlet 50 and a second location B at which the plurality of blades 200 close the outlet 50 and are positioned on the outlet 50. The plurality of blades 200 may linearly move back and forth between the first location A and the second location B in the radial direction of the outlet 50.

More specifically, the first location A of the plurality of blades 200 may be the cover area 91 formed outside the outlet 50 in the radial direction of the outlet 50. Also, the plurality of blades 200 may move to the second location B of closing the outlet 50 on the outlet 50 by moving linearly in the opposite direction of the radial direction of the outlet 50 from the first location A.

However, the first location A is not limited to the cover area 91, and may be any area of the lower housing 130, positioned outside the outlet 50 in the radial direction of the outlet 50, not the cover area 91.

That is, at least one portion of the lower housing 130 may be formed outside the outlet 50 in the radial direction of the outlet 50, and in this case, the plurality of blades 200 may move to above the at least one portion of the lower housing 130.

Also, the first location A is not limited to the at least one portion of the lower housing 130, and may be outside the outlet 50 in the opposite direction of the radial direction of the outlet 50. Accordingly, the first location A may be at least one area of the lower housing 130, positioned outside the outlet 50 in the opposite direction of the radial direction of the outlet 50.

That is, the first location A of the plurality of blades 200 may be a location linearly moved in the radial direction of the outlet 50 or in the opposite direction of the radial direction of the outlet 50 from the second location B.

At the second location B, the plurality of blades 200 may be arranged in a shape corresponding to the outlet 50 to close the outlet 50.

Figure 7:
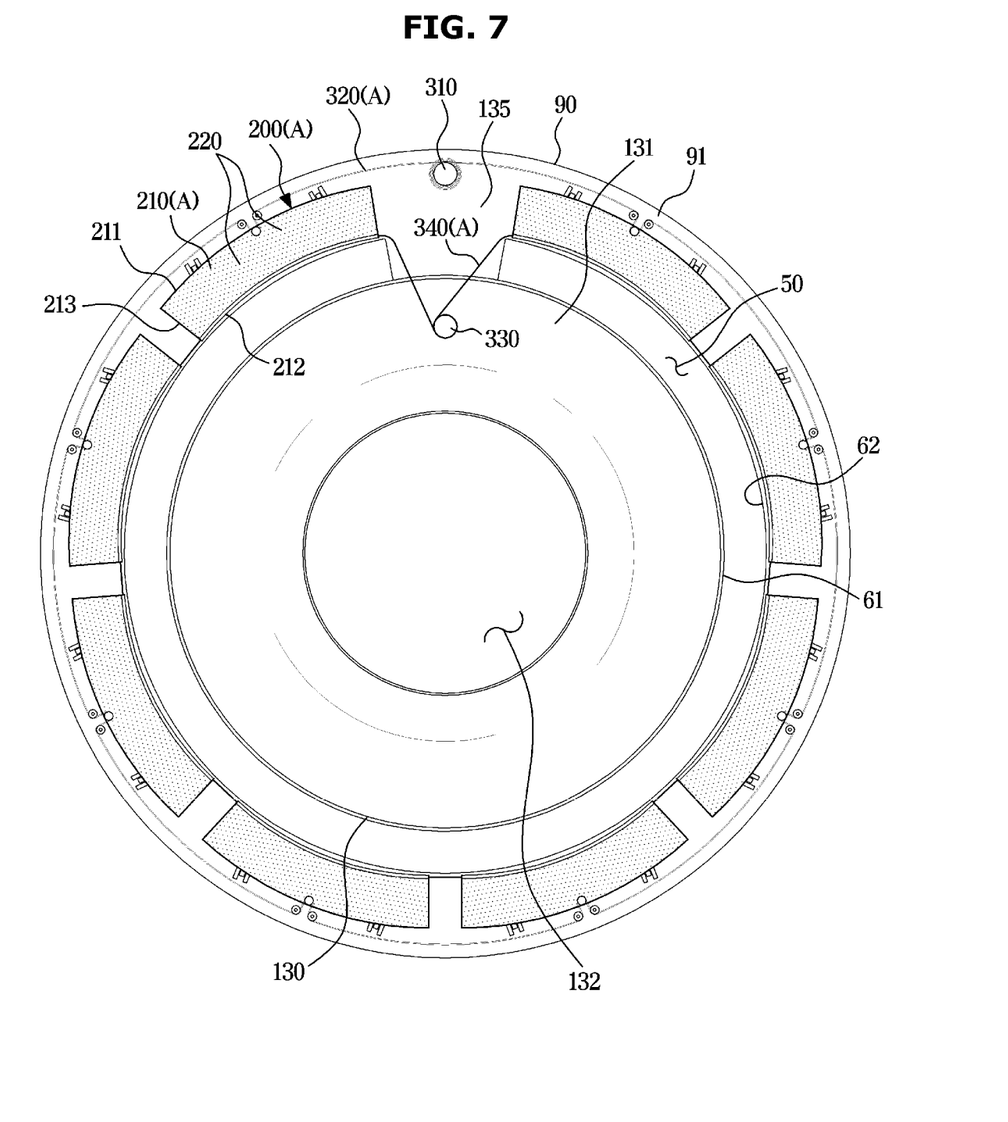
FIG. 7 schematically shows an operation state of an air conditioner according to an embodiment of the disclosure in a first mode.

The blade body 210 may include a side portion 213 connecting the outer circumferential portion 211 with the inner circumferential portion 212 and formed at both ends in the circumferential direction of the outlet 50 (see FIG. 7). As a result of positioning of the plurality of blades 200 at the second location B, the side portion 213 of the blade body 210 of each of the plurality of blades 200 may be in contact with a side portion 210 of a neighboring blade body 210. Accordingly, as a result of an arrangement of the plurality of blades 200 at the second location B, the plurality of blades 200 may close the outlet 50 such that air is discharged to the outside of the housing 100 through the plurality of holes 220.

Hereinafter, the driver 300 for moving the plurality of blades 200 and a movement of the plurality of blades 200 by the driver 300 will be described in detail.

Figure 8:
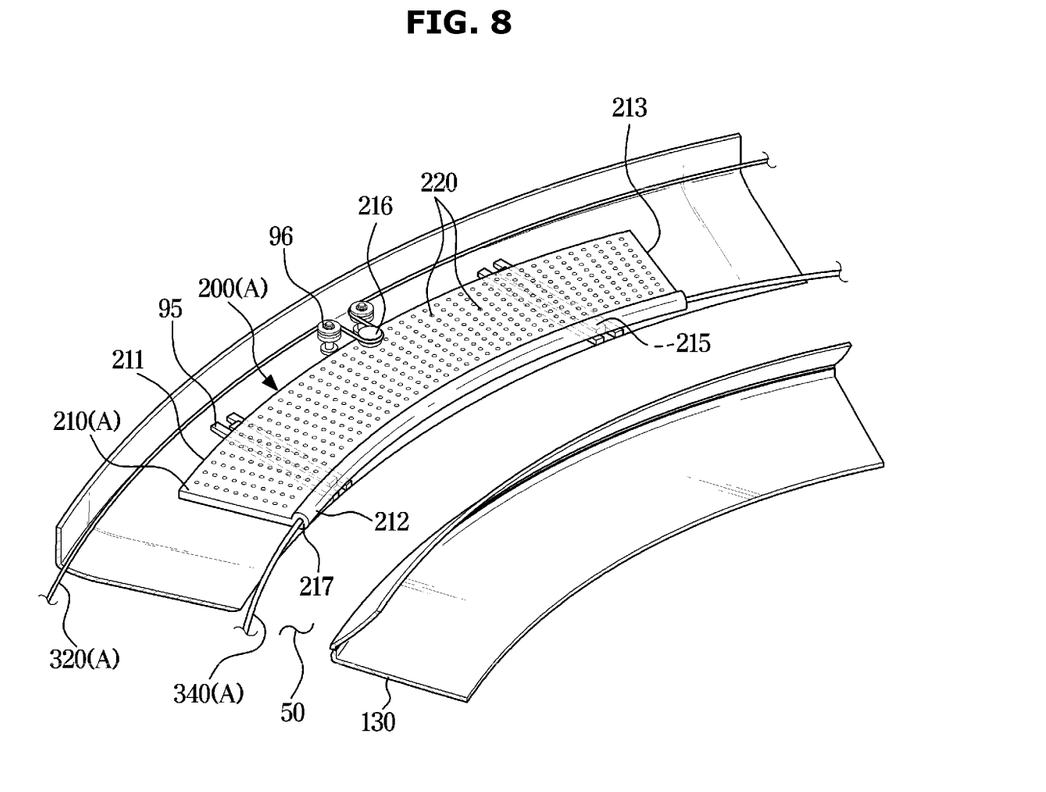
FIG. 8 shows some components of the air conditioner shown in FIG. 7.
Figure 9:
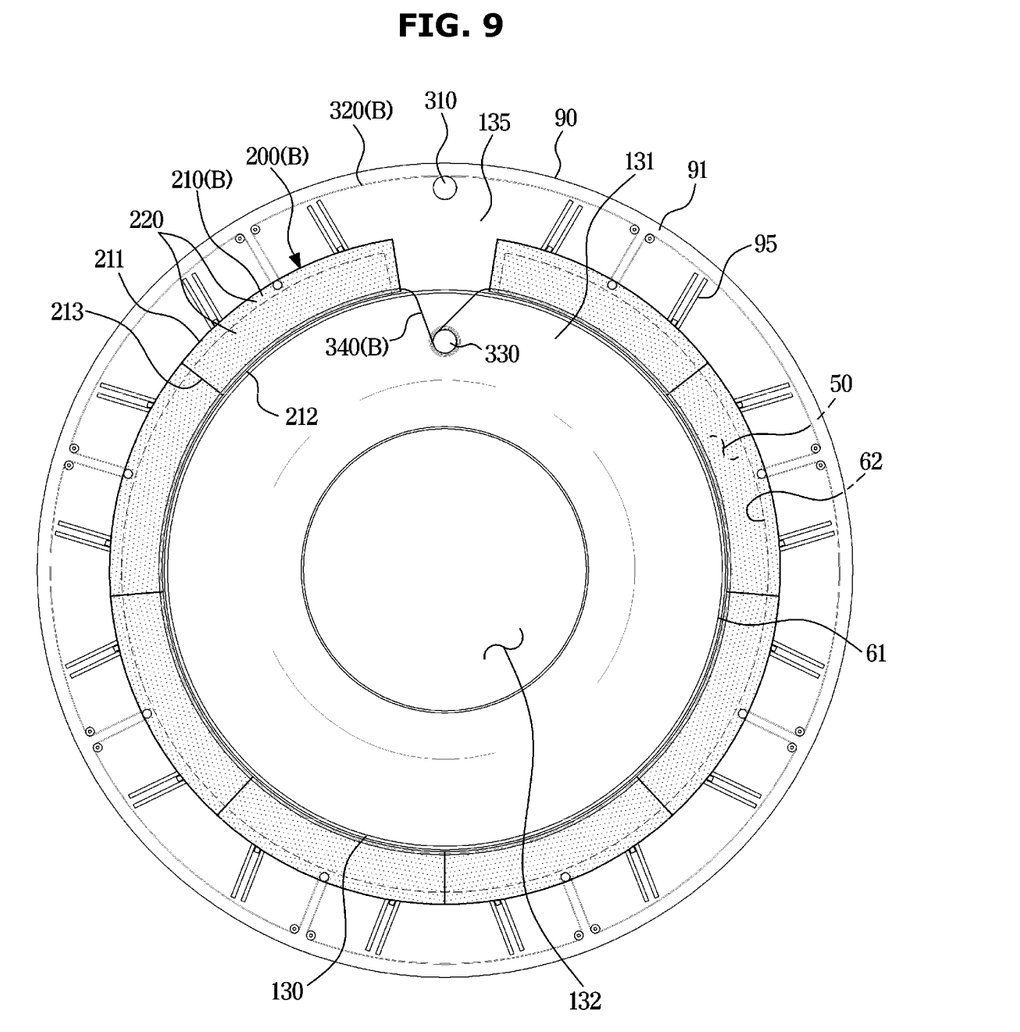
FIG. 9 schematically shows an operation state of an air conditioner according to an embodiment of the disclosure in a second mode.
Figure 10:
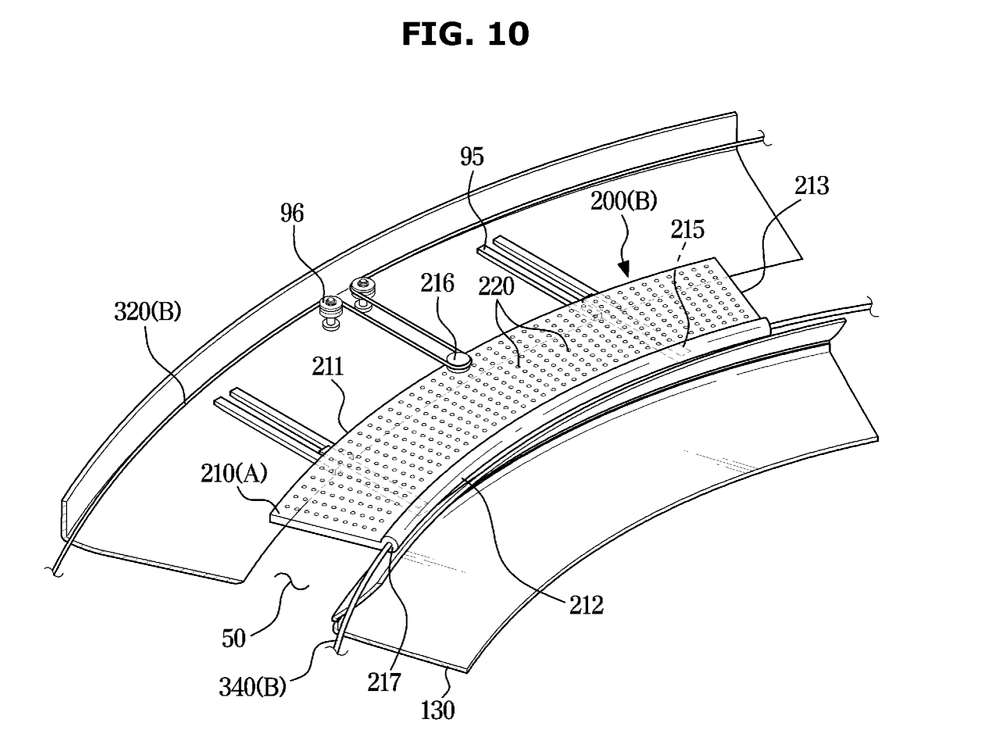
FIG. 10 shows some components of the air conditioner shown in FIG. 9.

FIG. 7 schematically shows an operation state of an air conditioner according to an embodiment of the disclosure in a first mode, FIG. 8 shows some components of the air conditioner shown in FIG. 7, FIG. 9 schematically shows an operation state of an air conditioner according to an embodiment of the disclosure in a second mode, and FIG. 10 shows some components of the air conditioner shown in FIG. 9.

FIGS. 7 and 8 show a state in which the plurality of blades 200 are positioned at the first location A in the air conditioner 1 operating in the first mode 1A.

FIGS. 9 and 10 show a state in which the plurality of blades 200 are positioned at the second location B in the air conditioner 1 operating in the second mode 1B.

The air conditioner 1 may include the driver 300 for operating the plurality of blades 200 such that the plurality of blades 200 move back and forth between the first location A and the second location B in the radial direction of the outlet 50.

The driver 300 may include a first driver 300a including a first wire 320 connected with the plurality of blades 200 and a first driving motor 310 connected with the first wire 320 and rotating to wind the first wire 320.

The first driver 300a may operate the plurality of blades 200 such that the plurality of blades 200 linearly move in the radial direction of the outlet 50.

The first driving motor 310 and the first wire 320 may form the first driver 300a of the driver 300.

The driver 300 may include a second driver 300b including a second wire 340 connected with the plurality of blades 200 and a second driving motor 330 connected with the second wire 340 and rotating to wind the second wire 340.

The second driver 300b may operate the plurality of blades 200 such that the plurality of blades 200 linearly move in the opposite direction of the radial direction of the outlet 50.

The first wire 320 may be a single wire. The first wire 320 may be connected with the plurality of blades 200 and the first driving motor 310. The first wire 320 may be connected with the first driving motor 310 and may be wound by interworking with a rotation of the first driving motor 310.

More specifically, each of the plurality of blades 200 may include a connecting portion 216 which is positioned adjacent to the outer circumferential portion 211 of the blade body 210 and with which at least one portion of the first wire 320 is connected by being wound thereon.

The first wire 320 may be connected with the plurality of blades 200 by being wound on the connecting portion 216 formed on each of the plurality of blades 200.

The connecting portion 216 may be positioned adjacent to the outer circumferential portion 211 in such a way as to be positioned substantially at a center of the outer circumferential portion 211 in the circumferential direction of the outlet 50. Accordingly, the first wire 320 may be connected with each blade 200 around a center of an outer edge of the blade 200.

The first wire 320 may be positioned at an outer location than the outer circumferential portion 211 of each of the plurality of blades 200 in the radial direction of the outlet 50, and extend along the circumferential direction of the outlet 50, wherein at least one portion of the first wire 320 extends in the opposite direction of the radial direction of the outlet 50 and is connected with the connecting portion 216.

The cover member 90 may include a wire guide 96 for guiding the first wire 320 such that the first wire 320 extends in the circumferential direction of the outlet 50 and at least one portion of the first wire 320 is toward the opposite direction of the radial direction of the outlet 50.

The wire guide 96 may change an extension direction of at least one portion of the first wire 320 extending in the circumferential direction of the outlet 50 such that the at least one portion of the first wire 320 extends in the opposite direction of the radial direction of the outlet 50.

Accordingly, the first wire 320 may be connected with the connecting portion 216 in the radial direction of the outlet 50.

One end of the first wire 320 may be connected with the first driving motor 310, and the first wire 320 may be connected with the plurality of blades 200 arranged substantially along the circumferential direction of the outlet 50 from the one end. Accordingly, the first wire 320 may extend along the circumferential direction of the outlet 50 from the first driving motor 310. The other end of the first wire 320 may again extend to the first driving motor 310, or may be fixed at a certain location on the cover member 90.

The second wire 340 may be a single wire. The second wire 340 may be connected with the plurality of blades 200 and the second driving motor 330. The second wire 340 may be connected with the second driving motor 330 and wound by interworking with a rotation of the second driving motor 330.

More specifically, each of the plurality of blades 200 may include a penetrating portion 217 which is positioned adjacent to the inner circumferential portion 212 of the blade body 210 and through which the second wire 240 penetrates the inner circumferential portion 212 along the circumferential direction of the outlet 50.

The second wire 340 may be connected with the plurality of blades 200 by penetrating the penetrating portion 417 formed in each of the plurality of blades 200.

One end of the second wire 340 may be connected with the second driving motor 330, and the second wire 340 may be connected with the plurality of blades 200 arranged substantially along the circumferential direction of the outlet 50 from the one end. Accordingly, the second wire 340 may extend along the circumferential direction of the outlet 50 from the second driving motor 330. The other end of the second wire 340 may again extend to the second driving motor 330, or may be fixed at a certain location on the cover member 90.

That is, the first wire 320 may be positioned adjacent to the outer circumferential portion 211 of the plurality of blades 200 while extending along the circumferential direction of the outlet 50, and the second wire 340 may penetrate the inner circumferential portion 212 of each of the plurality of blades 200 while extending along the circumferential direction of the outlet 50. Accordingly, both the first and second wires 320 and 340 may extend substantially in a shape of a ring, wherein the first wire 320 is positioned at an outer location than the second wire 340 in the radial direction of the outlet 50.

The first driving motor 310 may be positioned on the cover area 91 of the cover member 90. Accordingly, the first driving motor 310 may be not exposed to the outside. Also, as described above, the plurality of blades 200 may be positioned on the cover area 91 to be not exposed to the outside in the first mode 1A of the air conditioner 1, although not limited thereto.

However, the first driving motor 310 may be positioned inside the lower housing 130. In this case, the first wire 320 connected with the first driving motor 310 and the connecting portion 216 of each of the plurality of blades 200 may extend to the inside of the lower housing 130 from the cover area 91 via the blocking portion 150. Accordingly, the first wire 320 may be prevented from being exposed to the outside.

The second driving motor 330 may be positioned inside the lower housing 130. Accordingly, the second driving motor 330 may be not exposed to the outside. The second driving motor 330 may be positioned on the blocking portion 150, or inside the lower housing 130 while being adjacent to the blocking portion 150.

In this case, the second wire 340 connected with the second driving motor 330 and the penetrating portion 217 of each of the plurality of blades 200 may extend to the inside of the lower housing 130 via the blocking portion 150. Accordingly, the second wire 340 may be prevented from being exposed to the outside.

Each of the plurality of blades 200 may include a guide protrusion 215 positioned at a lower side of the blade body 210 and guiding the blade 200 to linearly move in the radial direction of the outlet 50 or in the opposite direction of the radial direction of the outlet 50.

The guide protrusion 215 may extend in the radial direction of the outlet 50.

The cover member 90 may include a guide rail 95 into which the guide protrusion 215 is inserted and which guides the guide protrusion 215. The guide rail 95 may extend in the radial direction of the outlet 50.

The guide protrusion 215 may be inserted into the guide rail 95, and upon applying of an external force to the plurality of blades 200, the guide protrusion 215 may move in the radial direction of the outlet 50 or in the opposite direction of the radial direction of the outlet 50.

According to a rotation of the first driving motor 310 to wind the first wire 320, the first wire 310 may be wound on the first driving motor 310, and accordingly, an extension length of the first wire 320 extending along the outlet 50 may be shortened in a direction in which the first driving motor 310 is positioned.

As described above, the first wire 320 may extend along the circumferential direction of the outlet 50 and be positioned at an outer location than the outer circumferential portion 211 of each of the plurality of blades 20 in the radial direction of the outlet 50. In this state, as the extension length of the first wire 320 is shortened, the plurality of blades 200 may move in the radial direction of the outlet 50 by interworking with the first wire 320.

More specifically, a portion of the first wire 210 between the wire guide 96 and the connecting portion 216 of each of the plurality of blades 200 may be shortened according to driving of the first driving motor 310, and the connecting portion 216 may move in the radial direction of the outlet 50 by interworking with the shortening in length of the first wire 210.

During driving of the first driving motor 210, the second driving motor 330 may be not driven. Accordingly, during driving of the first motor 310, the first wire 320 may be contracted, and the second wire 340 connected with the opposite sides of the plurality of blades 200 and being opposite to the first wire 320 in the radial direction of the outlet 50 may extend in length.

As the plurality of blades 200 move in the radial direction of the outlet 50, the penetrating portion 217 of each of the plurality of blades 200 connected with the second wire 340 may also move in the radial direction of the outlet 50 and accordingly, the length of the second wire 340 may extend.

According to driving of the first driving motor 310, the first wire 320 may become a reduction state A in which the length of the first wire 320 from the first driving motor 310 is shortened, and the second wire 340 may become an extension state A in which the length of the second wire 340 from the second driving motor 330 extends.

The first driving motor 310 may be driven until the inner circumferential portion 212 of each of the plurality of blades 200 is positioned at an outer location than the outer circumferential end 52 of the outlet 50 in the radial direction of the outlet 50 or the inner circumferential portion 212 of each of the plurality of blades 200 overlaps with the outer circumferential end 52 of the outlet 50 in the up-down direction.

Accordingly, the plurality of blades 200 may be positioned outside the outlet 50 in the up-down direction such that air is discharged through the outlet 50.

In contrast, according to a rotation of the second driving motor 330 to wind the second wire 340, the second wire 340 may be wound on the second driving motor 340 and thus, an extension length of the second wire 340 extending along the outlet 50 may be shortened in a direction in which the second driving motor 330 is positioned.

As described above, the second wire 340 may extend along the circumferential direction of the outlet 50 and penetrate the penetrating portion 217 of each of the plurality of blades 200 in the circumferential direction of the outlet 50. Therefore, according to the shortening in length of the second wire 340, the plurality of blades 200 may move in the opposite direction of the radial direction of the outlet 50 by interworking with the second wire 340.

More specifically, according to the shortening in length of the second wire 340, a circumference of the second wire 340 may be reduced, the second wire 340 may move in the opposite direction of the radial direction of the outlet 50, and the penetrating portion 217 of each of the plurality of blades 200 may also move in the opposite direction of the radial direction of the outlet 50 by interworking with the movement of the second wire 340.

During driving of the second driving motor 330, the first driving motor 310 may be not driven. Accordingly, during driving of the second driving motor 330, the second wire 340 may be contracted, and the first wire 320 connected with the opposite sides of the plurality of blades 200 and being opposite to the second wire 340 in the radial direction of the outlet 50 may extend in length.

According to the movement of the plurality of blades 200 in the opposite direction of the radial direction of the outlet 50, the connecting portion 216 of each of the plurality of blades 200 connected with the first wire 320 may also move in the opposite direction of the radial direction of the outlet 50, and accordingly, the length of the first wire 320 may extend.

According to driving of the second driving motor 330, the second wire 340 may become a reduction state B in which the length of the second wire 340 from the second driving motor 330 is shortened, and the first wire 320 may become an extension state B in which the length of the first wire 320 from the first driving motor 310 extends.

The second driving motor 330 may be driven until the inner circumferential portion 212 of each of the plurality of blades 200 overlaps with the inner circumferential end 51 of the outlet 50 in the radial direction of the outlet 50 in the up-down direction.

Accordingly, the plurality of blades 200 may be positioned on the outlet 50 in the up-down direction such that air is discharged through the plurality of holes 220 of the plurality of blades 200.

The air conditioner according to the disclosure may discharge heat-exchanged air at different wind speeds.

Also, the air conditioner may change a method for blowing heat-exchanged air according to a user's environment.

Also, the air conditioner may air-condition an indoor space in such a way as to prevent heat-exchanged air from blowing directly to a user, which leads to an improvement of the user's satisfaction.

Also, the air conditioner may change a method for blowing air that is discharged through the outlet being in a shape of a ring.

So far, specific embodiments have been shown and described. However, the disclosure is not limited to the above-described embodiments, and various modifications can be made by those skilled in the art without departing from the gist of the technical idea of the disclosure defined by the claims below.

What is claimed is:
1. An air conditioner comprising:
a housing including:
a cylinder portion,
an inlet to allow air to be introduced into the housing, and an outlet formed at a portion of the cylinder portion and having an arc shape to allow the air to be discharged to an outside of the housing;

a heat exchanger inside the cylinder portion and having an arc shape; and a plurality of blades, arranged along a circumferential direction of the outlet and configured to move back and forth along a radial direction of the outlet to selectively open or block the outlet;

a first wire connected with the plurality of blades and configured to be wound so that the plurality of blades move along the radial direction of the outlet; and a second wire connected with the plurality of blades and configured to be wound so that the plurality of blades move along an opposite direction of the radial direction of the outlet, wherein the plurality of blades includes a plurality of holes, respectively, to guide the air introduced through the inlet to be discharged to the outside of the housing while a blade among the plurality of blades blocks the outlet.

2. The air conditioner of claim 1, wherein the plurality of blades are moveable to be positioned outside the outlet along an up-down direction upon opening of the outlet, and upon blocking of the outlet, the blade among the plurality of blades is positioned on the outlet along the up-down direction.

3. The air conditioner of claim 2, further comprising a cover member covering a lower circumferential end of the housing, wherein the plurality of blades are moveable to be positioned in an area on the cover member along the up-down direction upon opening of the outlet.

4. The air conditioner of claim 2, wherein the housing further comprises a lower housing below the cylinder portion and in which the inlet is formed, and the plurality of blades are moveable to be in an inside area of the lower housing along the up-down direction upon opening of the outlet.

5. The air conditioner of claim 1, wherein each of the plurality of blades further comprises a blade body, respectively, in which the plurality of holes are formed, and a respective blade body of each of the plurality of blades is provided to close the outlet while the respective blade body of each of the plurality of blades is disposed on the outlet so that the air entered through the inlet is discharged to the outside of the housing through the plurality of holes of the blade.

6. The air conditioner of claim 1, further comprising a driver to operate the plurality of blades so that the plurality of blades moves back and forth along the radial direction of the outlet.

7. The air conditioner of claim 6, wherein the driver comprises a first driver configured to operate the plurality of blades so that the plurality of blades move along the radial direction of the outlet, and a second driver configured to operate the plurality of blades so that the plurality of blades move along an opposite direction of the radial direction of the outlet.

8. The air conditioner of claim 7, wherein the first driver comprises the first wire connected with the plurality of blades and a first driving motor connected with the first wire and configured to rotate and wind the first wire, and the plurality of blades move along the radial direction of the outlet by interworking with the first wire, upon winding of the first wire by the first driving motor.

9. The air conditioner of claim 8, wherein the second driver comprises the second wire connected with the plurality of blades and a second driving motor connected with the second wire and configured to rotate and wind the second wire, and the plurality of blades moves along the opposite direction of the radial direction of the outlet by interworking with the second wire, upon winding of the second wire by the second driving motor.

10. The air conditioner of claim 8, wherein each of the plurality of blades further comprise a respective blade body in which the plurality of holes are formed, and the first wire is connected at an outer edge of the respective blade body of each of the plurality of blades.

11. The air conditioner of claim 10, wherein the respective blade body comprises an outer circumferential portion positioned adjacent to an outer circumferential end of the outlet upon positioning of the blade on the outlet, and a connecting portion positioned at a center of the outer circumferential portion along the circumferential direction of the outlet and connected with the first wire.

12. The air conditioner of claim 11, wherein the first wire is a single piece, and the first wire is connected with all connecting portions of the plurality of blades.

13. The air conditioner of claim 9, wherein the plurality of blades further comprise a respective blade body in which the plurality of holes are formed, and the second wire is connected with the respective blade body adjacent to an inner edge along the radial direction of the outlet of the respective blade body of the plurality of blades.

14. The air conditioner of claim 13, wherein the respective blade body comprises an inner circumferential portion positioned adjacent to an inner circumferential end of the outlet upon positioning of the blade on the outlet, and a penetrating portion through which the second wire penetrates the inner circumferential portion along the circumferential direction of the outlet.

15. The air conditioner of claim 14, wherein the second wire is a single piece, and the second wire penetrates all penetrating portions of the plurality of blades.

* * * * *